United States Patent
Nelsen et al.

(10) Patent No.: US 7,921,058 B1
(45) Date of Patent: Apr. 5, 2011

(54) EXCHANGEABLE EQUITY-LINKED SECURITY

(75) Inventors: Charles J. Nelsen, New York, NY (US); Jonathan M. Ross, Eastchester, NY (US); Craig W. McCracken, Brooklyn, NY (US)

(73) Assignee: Bank of America Corporation, Charlotte, NC (US)

( * ) Notice: Subject to any disclaimer, the term of this patent is extended or adjusted under 35 U.S.C. 154(b) by 770 days.

(21) Appl. No.: 11/383,873

(22) Filed: May 17, 2006

(51) Int. Cl.
  *G06Q 40/00* (2006.01)
(52) U.S. Cl. ............. 705/43; 705/38; 705/26; 705/36 R; 705/37; 283/117
(58) Field of Classification Search ............... 705/36 R, 705/39, 36 T, 43; 283/117
  See application file for complete search history.

(56) References Cited

U.S. PATENT DOCUMENTS

| | | | |
|---|---|---|---|
| 6,381,585 B1* | 4/2002 | Maples et al. ............. | 705/36 R |
| 6,405,177 B1* | 6/2002 | DiMattina ................... | 705/26 |
| 7,222,094 B2* | 5/2007 | Ross ........................ | 705/36 R |
| 2002/0042770 A1* | 4/2002 | Slyke et al. ................ | 705/37 |
| 2002/0156709 A1* | 10/2002 | Andrus et al. .............. | 705/35 |
| 2003/0023526 A1* | 1/2003 | Stewart ...................... | 705/35 |
| 2003/0163400 A1* | 8/2003 | Ross et al. .................. | 705/35 |
| 2003/0163411 A1* | 8/2003 | Sato ........................... | 705/37 |
| 2004/0167849 A1* | 8/2004 | Yass et al. .................. | 705/37 |
| 2005/0027626 A1* | 2/2005 | Garcia ........................ | 705/35 |
| 2005/0102206 A1* | 5/2005 | Savasoglu et al. ......... | 705/35 |
| 2005/0102207 A1* | 5/2005 | Savasoglu et al. ......... | 705/35 |
| 2005/0102213 A1* | 5/2005 | Savasoglu et al. ......... | 705/36 |
| 2005/0192882 A1* | 9/2005 | Butler et al. ............... | 705/35 |
| 2005/0262000 A1* | 11/2005 | Sato ........................... | 705/35 |
| 2006/0080193 A1* | 4/2006 | McMurtray et al. ....... | 705/35 |
| 2006/0277084 A1* | 12/2006 | Barnard et al. ............. | 705/7 |
| 2006/0277125 A1* | 12/2006 | Zajkowski et al. ......... | 705/35 |
| 2006/0293985 A1* | 12/2006 | Lederman et al. ......... | 705/35 |
| 2007/0011068 A1* | 1/2007 | Zajkowski .................. | 705/35 |
| 2007/0088644 A1* | 4/2007 | Carlson ...................... | 705/35 |
| 2008/0027846 A1* | 1/2008 | Brady et al. ............... | 705/36 R |

OTHER PUBLICATIONS

"http://financial-dictionary.thefreedictionary.com/Convertible+Security">Convertible Security (Convertible).*
Internal Revenue Code Section 163 Interest, http://checkpoint.riag.com/servlet/com.tta.checkpoint.servlet, visited Oct. 20, 2006, pp. 1-17.

(Continued)

*Primary Examiner* — Ella Colbert
*Assistant Examiner* — Chika Ojiaku
(74) *Attorney, Agent, or Firm* — Michael A. Springs; Moore & Van Allen PLLC (57) ABSTRACT

A method of creating, selling, converting, and redeeming exchangeable instruments that may result in favorable tax and/or accounting treatment for a company that is a parent to an issuing subsidiary. The parent company transfers a conversion option to a wholly owned subsidiary. The subsidiary attaches the parent's conversion option to its own nonconvertible debt instrument, creating an exchangeable instrument to be issued to investors. Payment for the exchangeable instrument is remitted to the parent for the value of the conversion option and to the subsidiary with respect to the nonconvertible debt instrument. The split obligations of parent and subsidiary may result in a relatively high tax interest expense and relatively low accounting interest expense. Use of a net share settlement feature may result in reduced dilution of the parent's equity.

37 Claims, 6 Drawing Sheets

OTHER PUBLICATIONS

"Accounting Principles Board Opinion No. 14 (As Amended)", Accounting for Convertible Debt and Debt Issued with Stock Purchase Warrants, Mar. 1969.

"Accounting for Debt Convertible into the Stock of a Consolidated Subsidiary", Emerging Issues Task Force, Issue No. 99-1, 1999.

"Convertible Bonds with Issuer Option to Settle for Cash Upon Conversion", Emerging Issues Task Force, Issue No. 90-19, 1990.

"Rule 144A—Private Resales of Securities to Institutions", Securities Lawyer's Deskbook, http://www.law.uc.edu/ CCL/33ActRls/rule144A.html, visited Oct. 20, 2006, pp. 1-7.

"Statement of Financial Accounting Standards No. 128 (As Amended)", Earnings per Share, Feb. 1997, Accounting Research Manager, http:www.accountingresearchmanager.com, visited Oct. 20, 2006, pp. 1-68.

* cited by examiner

EXCHANGEABLE EQUITY-LINKED SECURITY

BACKGROUND

Many business entities raise money by means of a mix of debt instruments, such as bonds, and equity instruments, such as stock. The mix selected by a particular entity is influenced by prevailing interest rates, as well as other factors such as the extent to which the market is willing to purchase newly issued instruments of one type or the other at any particular time. Convertible instruments have some of the qualities of bonds as well as some of the qualities of stock. A convertible instrument, such as a convertible bond, is a debt instrument that can be converted by its holder into a number of shares of stock of the issuer, the number typically being fixed or being determined by a formula. Often, such an instrument has a conversion price per share. The conversion price is divided into the par value of the bond to determine the number of shares available in the conversion. Thus, a holder has the option of converting the bond into shares of stock, as opposed to simply cashing in the bond in order to retire the debt obligation of the issuer. Convertible bonds afford a holder the opportunity to benefit from increases in the issuer's stock value while generally providing the protection of a guaranteed return if the stock value does not increase.

An exchangeable instrument, such as an exchangeable bond, is similar to a convertible instrument except that instead of being exchangeable by the holder into equity, such as shares, of the issuer, the exchangeable bond may be exchanged for shares of a third-party company. Exchangeable bonds are generally treated in an identical manner as convertible bonds under an issuer's consolidated generally accepted accounting principles (GAAP) where such bond is convertible into the equity of a consolidated entity. The same terminology may be used to describe convertible and exchangeable bonds, and accordingly when "convertible" and other terms applicable to convertible bonds are used herein, it should be understood that such terms are referring to exchangeable bonds.

Traditional nonconvertible bonds are issued by an Issuer, who is in effect a borrower. Investors or holders of the bonds may be considered lenders. For the use of the Investor's money, the Issuer pays a coupon, or interest rate on the loan, to the Investor. A bond indenture, the formal written agreement between the Issuer and the Investor that governs the bond issue, sets forth the obligations of the Issuer. Such obligations may include the coupon, interest payment dates, the maturity date, and repayment conditions.

In a traditional convertible bond, an Issuer embeds a conversion option on its stock into a bond. It is the conversion option that offers Investors in the convertible bond the opportunity to convert the bond into a fixed number of shares of the Issuer's common stock. The number of shares is set at a premium to the market price, essentially creating a written call option, or a contractual right to buy a specific number of shares at a predetermined price before expiration of the contract, on the Issuer's stock in the convertible bond. Because the Investor is getting the opportunity to participate in equity gains via the bond, the coupon for the bond is lower than for a normal debt instrument with a similar maturity. Effectively the Issuer embeds the conversion option into the convertible bond in exchange for paying the Investor a lower coupon. In addition to the obligations documented in an indenture for a traditional nonconvertible bond, the indenture for a convertible bond may also include conversion provisions such as a conversion price, and an anti-dilution clause.

From an Issuer's vantage point, two key factors to consider when issuing bonds are the tax treatment and the accounting treatment. For traditional nonconvertible bonds the Internal Revenue Service allows a tax interest expense equal to the extent of the coupon, which is the Issuer's straight borrowing rate and may be, for example, 6-7%. For accounting purposes, the Issuer also must record interest expense equal to that coupon. Traditional nonconvertible bonds do not provide opportunity for an Investor to benefit from increases in the share price and have a relatively high interest expense for accounting purposes. For traditional convertible bonds, the Internal Revenue Service typically also gives an Issuer of a convertible bond a tax deduction to the extent of the coupon, but here the coupon is reduced as compared to the traditional nonconvertible bond. If a bond is issued with a 2% coupon, then 2% is the deductible amount. For accounting purposes, the Issuer must record a tax and accounting interest expense equal to the coupon. Therefore, traditional convertible bonds have a relatively low allowable tax deduction. Traditional nonconvertible bonds and traditional convertible bonds each lack the cumulative benefits of a relatively high tax interest expense deduction, a relatively low accounting and cash interest expense, and the opportunity to participate in equity gains.

SUMMARY

Embodiments of the present invention can provide methods to create an exchangeable equity-linked security that may result in favorable tax treatment, accounting treatment, or both. In one embodiment the method includes a parent company creating a warrant, for example, a conversion option, that permits conversion of a debt instrument into an equity position in the parent company. The parent company transfers the warrant to a subsidiary company of the parent company. The subsidiary company creates a nonconvertible debt instrument, and subsequently attaches the warrant to the debt instrument.

In accordance with another embodiment of the present invention, a method of creating an exchangeable equity-linked security includes a parent company creating a conversion option that permits conversion of a bond into shares of stock in the parent company. The parent company transfers the conversion option to a wholly owned, fully consolidated subsidiary company of the parent company. The subsidiary company creates a nonconvertible bond and attaches the conversion option to the bond. The inseparability of the warrant and debt instrument are documented in an indenture.

In accordance with another embodiment of the present invention, a method of creating an exchangeable equity-linked security includes a parent company creating a warrant that permits conversion of an underlying debt instrument into an equity position in the parent company, with the parent company transferring the warrant to a first subsidiary company, which is a subsidiary of the parent company. The first subsidiary company creates a first nonconvertible debt instrument. The first subsidiary company transfers, either directly or through other subsidiary companies, the warrant and the first debt instrument to a second subsidiary company, which is either directly or indirectly a subsidiary company of the first subsidiary company. The second subsidiary company creates a second nonconvertible debt instrument, and attaches the warrant to the second debt instrument.

In accordance with another embodiment of the present invention, a method of creating an exchangeable equity-linked security includes a parent company creating a conversion option that permits conversion of a debt instrument into shares of stock in the parent company. The parent company transfers the conversion option to a first subsidiary company, which is a wholly owned, fully consolidated subsidiary of the parent company. The first subsidiary company creates a first nonconvertible bond and transfers, either directly or through other subsidiary companies, the conversion option and the first bond to a second subsidiary company, which is either directly or indirectly a wholly owned, fully consolidated subsidiary company of the first subsidiary company. The second subsidiary company creates a second nonconvertible bond, and attaches the conversion option to the second bond. The conversion option and debt instrument inseparability is documented an indenture.

In accordance with another embodiment of the present invention, a method of executing a transaction to transfer an exchangeable equity-linked security is provided. A parent company transfers a warrant either directly, or indirectly through subsidiary companies, to a subsidiary company, and the subsidiary company issues a convertible instrument including a nonconvertible debt instrument and the warrant. The method includes remitting payment from a holder for the convertible instrument to the parent company for the value of the warrant and to the subsidiary company for the value of the debt instrument.

In accordance with another embodiment of the present invention, a method of selling an exchangeable equity-linked security includes a subsidiary company of a parent company issuing a convertible instrument, including a nonconvertible debt instrument and a warrant. Payment from a holder for the security is remitted to the parent company for the value of the warrant and to the subsidiary company for the value of the debt instrument.

In another embodiment of the present invention, a method of selling an exchangeable equity-linked security is provided that includes an indirect subsidiary company of a parent company issuing a convertible instrument, including a nonconvertible debt instrument and a warrant. Payment from a holder for the security is remitted to the parent company for the value of the warrant and to the subsidiary company that issues the convertible instrument for the value of the debt instrument.

The features, functions, and advantages can be achieved independently in various embodiments of the present invention or may be combined in yet other embodiments.

DETAILED DESCRIPTION

The present invention will now be described in terms of specific, example embodiments. It is to be understood that the invention is not limited to the example embodiments disclosed. It should also be understood that not every feature of the systems and methods described is necessary to implement the invention as claimed in any particular one of the appended claims. Various elements, steps, processes, and features of various embodiments of systems and processes are described in order to fully enable the invention. It should also be understood that throughout this disclosure, where a process or method is shown or described, the steps of the method may be performed in any order or simultaneously, unless it is clear from the context that one step depends on another being performed first. Also, time lags between steps can vary. Although convertible bonds, exchangeable bonds, and stock shares are referred to herein, it should be understood that such references include any exchangeable instruments and any associated equity positions.

The present invention may involve the issuance of a debt instrument by a domestic subsidiary of a publicly traded U.S. company (the "Parent") that is exchangeable into the Parent's equity, such as stock. This exchangeable bond, or more generally, an exchangeable equity-linked security, may be referred to herein as a convertible bond or merely "the Convertible." The present invention may allow concurrent favorable tax and accounting treatment of such instruments. A "net share settlement feature" may be used in the present invention, as disclosed in U.S. application Ser. No. 10/249,542, filed Apr. 17, 2003, entitled "Convertible Financial Instruments with Cash Settlement Features," the entire disclosure of which is hereby incorporated by reference. The net share settlement feature allows the Issuer to use the "treasury stock" method of accounting rather than the "if-converted" method that is conventionally used for convertible bonds, and may thereby calculate an improved diluted earnings per share (EPS). The treasury stock method, in addition to reducing dilution, may permit a favorable interest expense, equal to the coupon, for accounting purposes. The net share settlement feature is used in the present invention in order to realize accounting benefits as set forth in Financial Accounting Standards Board (FASB) Statement No. 128, and mostly recently in the Exposure Draft (Revised) to FASB Statement 128, File Reference No. 1240-001. The net share settlement feature is used in the present invention in order to realize tax benefits of an Original Issue Discount (OID) as set forth in Internal Revenue Code Section 163, although other tax rulings or regulations may also structure desired benefits.

An example of the net share settlement feature providing the ability to net share settle a convertible bond to reduce the amount of dilution the Issuer experiences is as follows. If the Issuer's stock has a market price of $100 when the bond is issued, the conversion threshold is $120, and the market price of the Issuer's stock when the bond is converted is $140, the Issuer can satisfy the Investor's conversion by delivering $100 (the principal of the bond) in cash and $20 (the difference between the conversion threshold and the market price of the Issuer's stock) in shares. As noted above, the advantage of the net share settlement feature is that it allows the Issuer to use the treasury stock method, which may result in much lower EPS dilution when the stock price rises above $120.

To establish the net share settlement feature, an Issuer issues convertible instruments under specified terms to an Investor. The specified terms include a cash settlement feature that enables the Issuer to settle up to par in cash as opposed to shares, and requires settlement of the net amount, or remainder, in shares (net shares). The net share settlement feature is spelled out in the convertible instrument. Additionally, the net share settlement feature is typically described in any relevant offering document, such as an offering memorandum, circular, or a prospectus. The Issuer then documents its intention to settle the par value of convertible instruments in cash and the remainder in shares of the Issuer's stock. This documentation in some embodiments takes the form of a letter or letters to the Issuer's auditor or auditors. With the net share settlement feature in place, an issuer takes the convertible instruments into account using a treasury stock accounting formula to calculate its diluted earnings per share (EPS).

Figure 1:
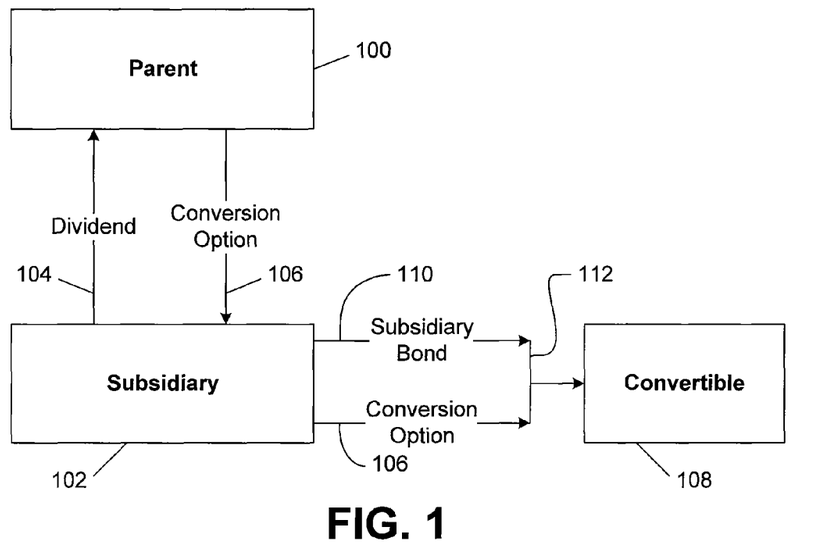
FIG. 1 is a schematic diagram of the parties and activity required to create a convertible instrument in accordance with an embodiment of the present invention.

In one embodiment of the present invention, as shown in FIG. 1, a publicly traded U.S. parent company, the Parent 100, wholly owns a fully consolidated domestic Subsidiary 102. A Parent that is a U.S. C Corporation with publicly traded common stock may benefit from the present invention; other types may benefit as well. Whether the Subsidiary 102 wholly owned and fully consolidated impacts factors such as tax treatment, accounting treatment, and reporting requirements; depending on desired outcomes the Subsidiary 102 may be wholly owned and/or fully consolidated as selected by one of ordinary skill in the art. The Subsidiary 102 may or may not make a separate entity election for U.S. federal income tax purposes. The Subsidiary 102 pays the Parent 100 a dividend 104 based on the Parent's stock ownership in the Subsidiary 102. The Parent 100 transfers a warrant, which in this embodiment is conversion option 106, to the Subsidiary 102 as part of creating a Convertible 108 approaching or on the issuance date of the Convertible 108. For the purposes of the present invention, a warrant is any equity-linked instrument that allows an investor to acquire shares when the value of an underlying equity position, such as underlying common stock, exceeds a certain amount. Examples of warrants include, but are not limited to, conversion options, equity instrument conversion options, call options and warrants, put options and warrants, and certain structured forward contracts. The transfer of the conversion option 106 includes an agreement that provides that the Subsidiary 102 may issue the Convertible, which comprises a conventional, nonconvertible bond 110 and the Parent's conversion option 106, and allows Investors to convert the bond 110 into shares of the Parent's stock. The Subsidiary 102 prepares an indenture that attaches the conversion option 106 to create the Convertible 108.

The net share settlement feature for the conversion option 106 is mandatory as set forth in the agreement between the Parent 100 and the Subsidiary 102 and in the indenture. The Subsidiary 102 is required to repay the principle of the proceeds of the convertible bond issuance, which is the par of the Subsidiary bond 110. The proceeds may be allocated between the Parent 100 and its Subsidiary 102, creating a Subsidiary bond obligation with an OID and an interest expense deduction equal to the convertible bond's coupon and the amortization of the OID. OID is the difference between the price paid by Investors, including the Conversion Option 106, and the value of the nonconvertible Subsidiary bond 110, providing a discount as takes place with zero-coupon bonds. Any debt instrument, including traditional convertible bonds, may have an OID.

Therefore, the Subsidiary 102 will contribute a Subsidiary bond 110, which is a discounted bond that pays a coupon and par at maturity. The Parent 100 will contribute a net share settled conversion option 106, giving Investors the opportunity to benefit from increases in the Parent's stock price above a predetermined level.

The Parent conversion option 106 may be structured as (i) a Parent-amortizing debt obligation equal to the difference between the par value of the Convertible 108 and the accreted value owed by the Subsidiary 102 with respect to the Subsidiary bond 110 upon an early conversion or put of the Convertible 108, and (ii) a conversion option with respect to the Parent's common stock. Alternatively, the Parent conversion option 106 may be structured as a single instrument providing that upon an early conversion, the Parent 100 will pay the difference between the par value of the Convertible and the accreted value of the Subsidiary bond in cash, placing the Investors in the same cash and share position that they would have upon conversion of a traditional net share settled convertible bond.

Figure 2:
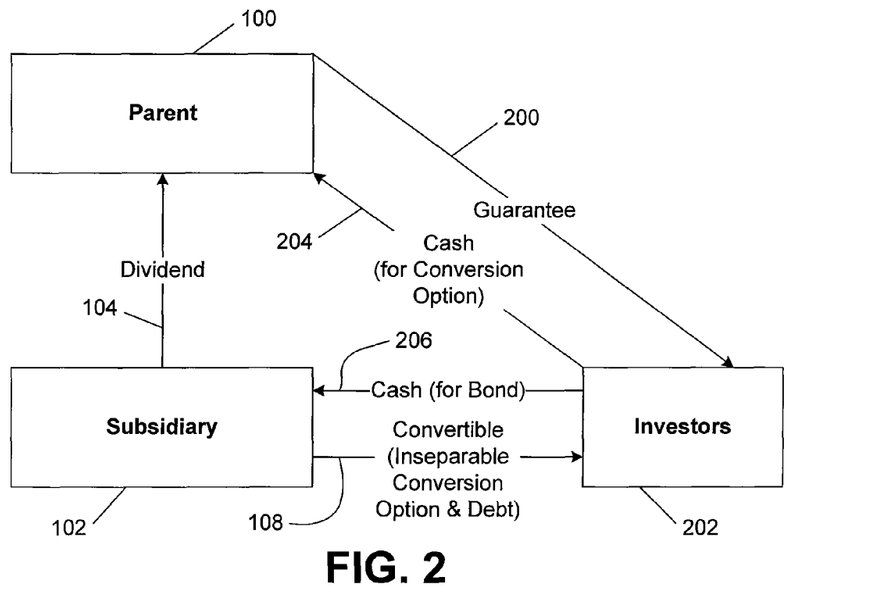
FIG. 2 is a schematic diagram of the parties and transactions associated with the sale of a convertible instrument of FIG. 1.

FIG. 2 illustrates the transactions associated with issuing the Convertible 108. The Subsidiary 102 issues the Convertible 108. In addition to the conversion option 106 transferred to the Subsidiary 102 to create the Convertible 108, the Parent 100 guarantees 200 the payment of interest, principal, and any conversion value in excess of the par amount to the Investors 202. At the time the Convertible 108 is issued, its proceeds are allocated, generally by a transfer agent, a broker/dealer, a sub-agent if one is appointed, or other third party (not shown), between cash 204 for the conversion option 106 to the Parent 100 and cash 206 for the Subsidiary bond 110 to the Subsidiary 102, creating an OID for the Subsidiary bond 110, as outlined in the indenture. For example, if the Convertible 108 is sold for $1,000 and the conversion option 106 is worth 20% or $200 of the bond's value, the transfer agent will divide the $1,000 and pay $200 to the Parent 100 and $800 to the Subsidiary 102 (and retain an additional amount to cover costs and fees). The indenture sets the value of the conversion option 106, which if desired may be determined by various models, including, for example, the Black-Scholes or Binomial option pricing models. At the Subsidiary level, the Subsidiary bond 110 that the Subsidiary 102 has issued now has a tax basis of $800, and the Subsidiary 102 is obligated to pay any bond coupon as well as full principle (i.e. $1,000) at maturity. This arrangement creates an OID of $200 much like a zero coupon bond.

During the term of the Convertible 108, the Subsidiary 102 will make all interest payments on the Subsidiary bond 110 to Investors 202, accreting the amount it owes to Investors on the Subsidiary bond 110 up to an amount equal to the par value of the Subsidiary bond 110, which equals the par value of the Convertible 108.

For tax purposes, the Subsidiary 102 is allowed to accrete the OID as interest expense over the life of the Subsidiary bond 110. The Parent 100 is able to claim the Subsidiary's interest expense deduction on its consolidated tax return. Therefore, the Parent 100 will be able to deduct for a bond in which the tax interest expense will be equal to the coupon plus the accretion of the OID, the total of which may approximate the Parent's straight borrowing rate. When the Subsidiary 102 attaches 112 the conversion option 106 to the Subsidiary's original issued discounted bond 110 (along with structuring the combined features to handle early conversions), the combined structure of the Subsidiary bond 110 and conversion option 106 are not allowed to be separated. For accounting purposes, Accounting Principle Board 14 (APB 14) provides the accounting guidance for these types of transactions, i.e. when there is a conversion option in a bond and they are inseparable. In this case APB 14 requires that the Convertible 108 be accounted for like a traditional convertible bond. The Parent 100 will show an interest expense coupon that is equal to the coupon of the Convertible 108. In the above example, this equates to a bond with a 2% coupon and 20% conversion option. Therefore, the Parent 100 records interest expense at 2% for accounting purposes. The traditional convertible bond treatment requires recognition of the OID for accounting purposes. For tax purposes as noted above, the Parent's expense would be recorded at an amount closer to the Parent's straight borrowing rate, which might be 6-7%. Thus, by separating payment for the Convertible into the cash 204 for the conversion option 106 payable to the Parent 100 and the cash 206 for the Subsidiary bond 110 payable to the Subsidiary 102, the transfer agent has enabled the Parent 100 to generate tax deductions above the stated coupon of the Subsidiary bond 110 while not increasing the accounting interest expense charge, and the recognized accounting interest expense excludes the OID that must be recognized for a traditional convertible bond.

Figure 3:
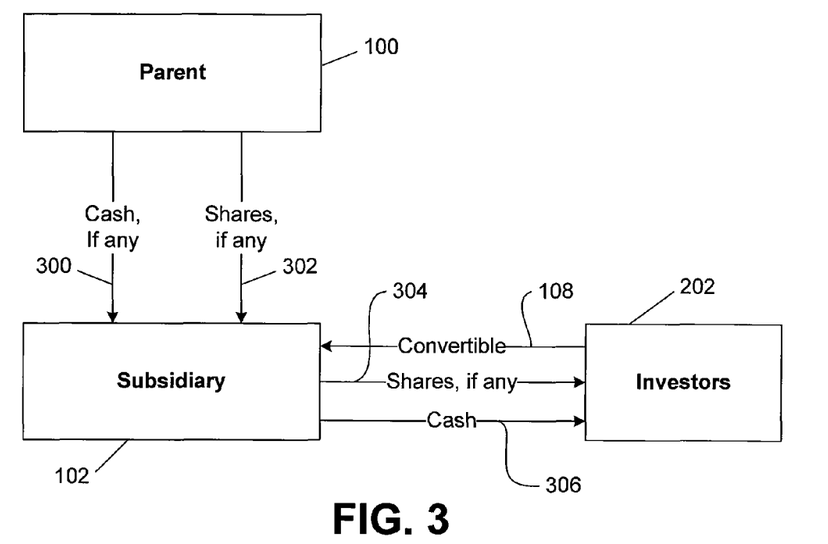
FIGS. 3 and 4 are schematic diagrams of the parties and transactions associated with the conversion or maturity of the convertible instrument of FIG. 1.

As shown in FIG. 3, upon conversion of the Convertible 108, the Parent 100 will deliver to the Subsidiary 102 (i) cash 300 equal to the difference, if any, between the par value of the Convertible 108 and the accreted face amount of the Subsidiary bond 110 and (ii) shares 302 equal to the difference in value, if any, between the parity value of the Convertible 108 (which equals the share price at maturity multiplied by the conversion rate) and the par value of the Convertible 108. The Subsidiary 102 will, in its role as the Parent's agent, deliver to Investors 202 the shares 304, if any, and cash 206 equal to the par value of the Convertible 108. The Subsidiary 102 may elect to have its transfer agent duties for the Parent's stock and any cash remaining under the Parent's amortizing debt obligation performed by a sub-agent. The Convertible 108 indenture will state that it is the Parent's contractual obligation to deliver shares and, if required, cash upon conversion of the Convertible 108.

As an example, assume that a Convertible 108 providing for net share settlement is issued for $1,000 including a conversion option 106 worth $200 and a Subsidiary bond with an initial accreted value of $800 accreting to a par of $1,000. The following payments will be made to the Investor 202 upon an early conversion, or prior to a maturity of, for example, five years. For this example, the conversion value (say $1,200) of the Convertible 108 is greater than par ($1,000). The Subsidiary 102 would owe the accreted face amount of the bond (e.g., $900). The Parent 100 would owe cash 300, if any, in an amount equal to the difference between the par value of the Convertible 108 and the accreted face amount of the bond (e.g., $1,000−$900=$100) plus a number of shares 302, if any, the value of which equals the parity value of the Convertible 108 minus the par value of the Convertible 108 (e.g., $1,200−$1,000=$200 worth of shares, for a total of $300 value from the Parent 100).

Next, assume that the Convertible 108 is converted at maturity and the conversion value (again say $1,200) of the Convertible 108 is greater than par (e.g., $1,000). The maturity of the Convertible 108 may be equal to the first put/call date (e.g., 5 years) or it may equal the stated maturity of the Convertible 108 (e.g., 20 years). The Subsidiary 102 would owe the accreted face amount of the bond (e.g., $1,000). The Parent 100 would owe cash 300, if any, in an amount equal to the difference between the par value of the Convertible 108 and the accreted face amount of the bond (e.g., $1,000−$1,000=$0) plus a number of shares 302, if any, the value of which equals the parity value of the Convertible minus the par value of the Convertible (e.g., $1,200−$1,000=$200 worth of shares, for a total of $200 value from the Parent).

In both instances the Subsidiary 102 disburses shares 304, if any, and cash 306 to the Investors 202. The Investors 202 receive the conversion value of the Convertible 108 ($1,200), but the distribution of the cash the Parent 100 and the Subsidiary 102 each pay differs. The amount of shares paid by the Parent 100 is the same in each example.

Figure 4:
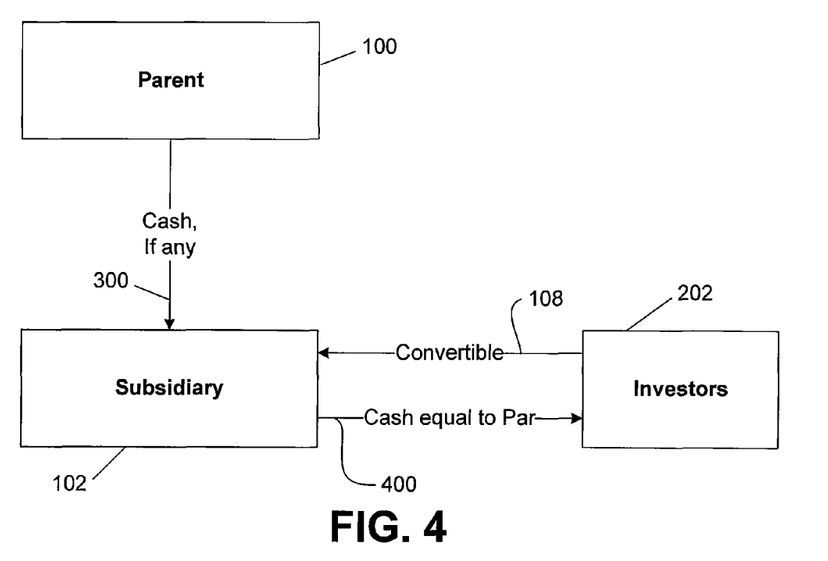

Upon a put of the Convertible 108, the Subsidiary 102 will deliver in cash the accreted face amount of the Subsidiary bond 110 directly to Investors 202. Alternatively, as shown in FIG. 4, at maturity the Subsidiary 102 will deliver in cash 400 the par of the Subsidiary bond 110 directly to Investors 202. The Parent 100 will deliver to Investors 202, through the Subsidiary 102, an amount in cash 300, if any, equal to the difference between the par value of the Subsidiary bond 110 and the accreted face amount of the Subsidiary bond 110.

Figure 5:
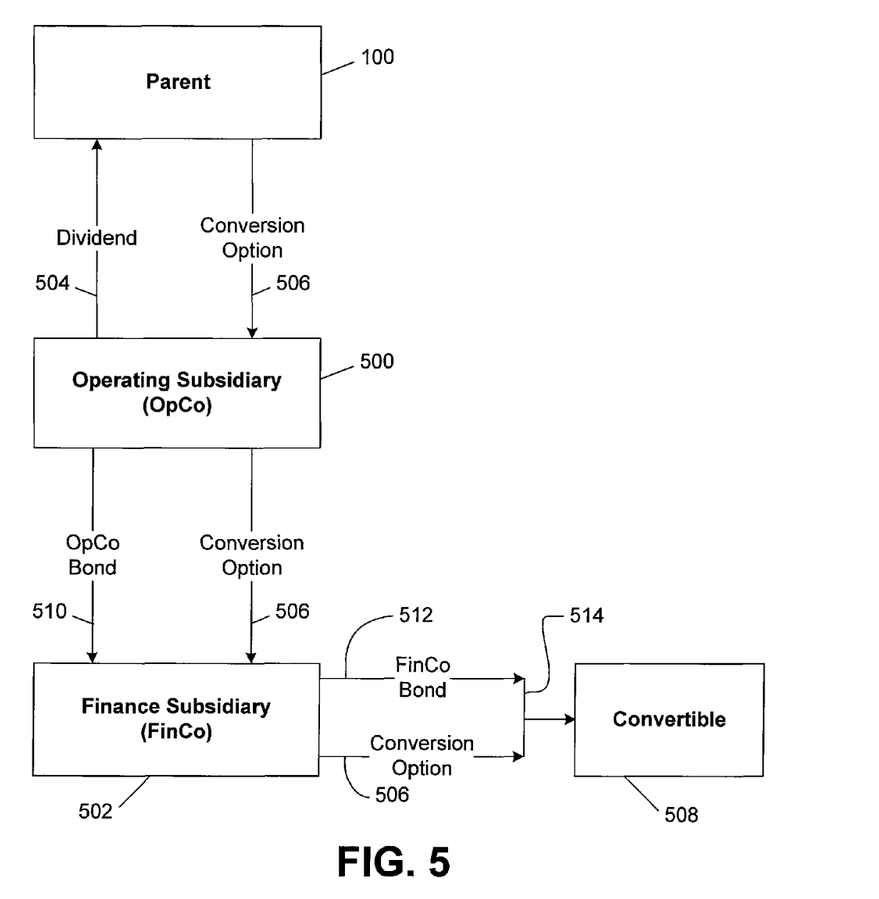
FIG. 5 is a schematic diagram of the parties and activity required to create a convertible instrument in accordance with another embodiment of the present invention.

In other embodiments there may be more than one subsidiary involved in the transaction. For example, as shown in FIG. 5, there may be an Operating Subsidiary 500 ("OpCo," or a primary subsidiary) that is a wholly owned subsidiary of the Parent 100, and another subsidiary, Finance Subsidiary 502 ("FinCo," or a secondary subsidiary) that is a wholly owned subsidiary of OpCo 500. Each of the subsidiary entities 500, 502 involved may or may not make a separate entity election for U.S. federal income tax purposes. FinCo 502 may be a disregarded entity for U.S. federal income tax purposes and it may be utilized to reduce Securities and Exchange Commission (SEC) disclosure obligations in connection with the issuance. In addition, pursuant to an exemption provided in Section 3(a)(5) of the Investment Company Act of 1940, FinCo 502 would not need to register with the SEC under the '40 Act. Much of the transaction is the same as when there is only one subsidiary; the following description primarily highlights the differences. FinCo 502 generally fills the role that the Subsidiary 102 fills in FIGS. 1 through 4. In the embodiment described below there are two subsidiaries, such that there is only one intermediate subsidiary OpCo 500, which is a direct subsidiary of the Parent 100. It should be understood, however, that there could be additional intermediate subsidiaries, each filling a role similar to OpCo 500, whereby the subsidiary issuing the convertible instrument would indirectly be a subsidiary of the Parent 100 and may be referred to as an indirect subsidiary.

OpCo 500 pays the Parent 100 a dividend 504 based on the Parent's stock ownership in OpCo 500. The Parent 100 transfers a conversion option 506 to FinCo 502 via OpCo 500 approaching or on the issuance date of the Convertible 508. The conversion option 506 is transferred by two agreements: the first provides that the Parent 100 transfers the conversion option 506 to OpCo 500 and that OpCo 500 will transfer the conversion option 506 to FinCo 502, and the second provides that OpCo 500 transfers the conversion option 506 to FinCo 502. OpCo 500 issues a conventional, nonconvertible bond (the OpCo bond 510) to FinCo 502 that mirrors the terms of a conventional, nonconvertible bond (the FinCo bond 512) to be issued to Investors 202 by FinCo 502. Additional intermediate subsidiaries would issue their own bonds to their intermediate subsidiaries or to FinCo 502. FinCo 502 may issue the Convertible 508, which includes the FinCo bond 512 and the Parent's conversion option 506, and that allows the Investors 202 to convert the FinCo bond 512 into shares of the Parent's stock. The coupon payments on both OpCo's bond 510 and the FinCo bond 512 will be equal to the stated coupon on the Convertible 508. FinCo 502 prepares an indenture that attaches the conversion option 506 to the FinCo bond 512 to create the Convertible 508.

Figure 6:
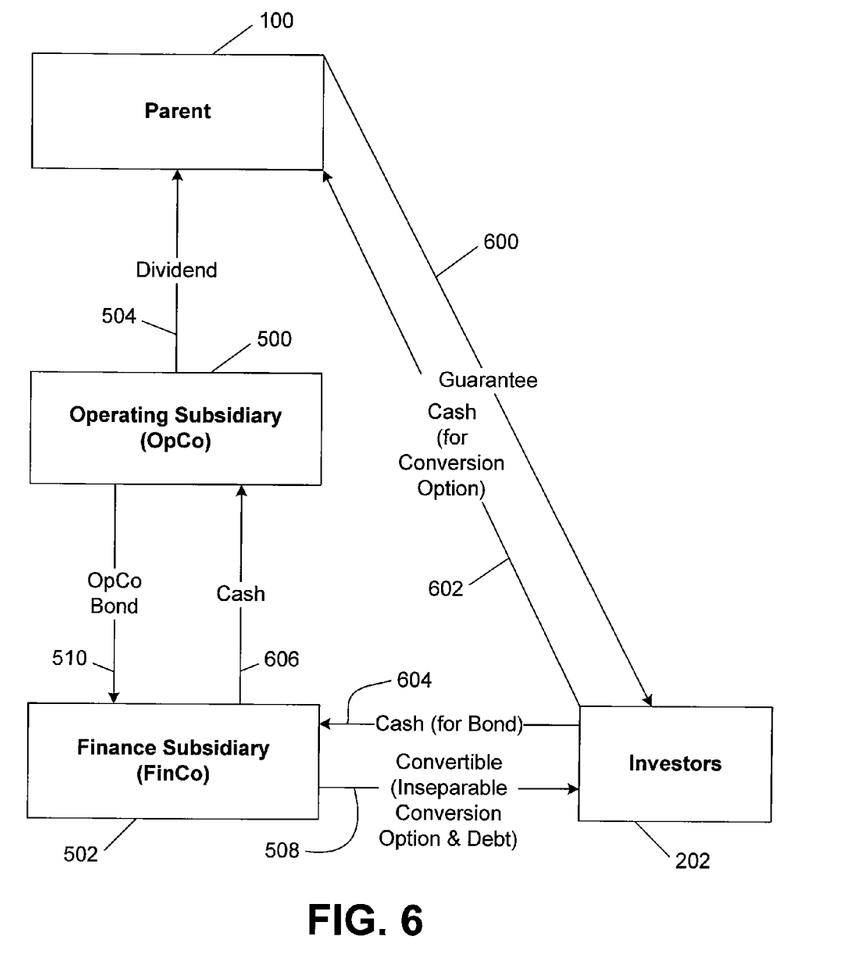
FIG. 6 is a schematic diagram of the parties and transactions associated with the sale of a convertible instrument of FIG. 5.

FinCo 502 issues the Convertible 508 to the Investors 202. In addition to the conversion option 506 transferred to FinCo 502, the Parent 100 guarantees 600 the payment of interest, principal, and any conversion value in excess of the par amount to the Investors 202. At the time the Convertible 508 is issued, its proceeds are allocated, generally by a transfer agent, a broker/dealer, a sub-agent if one is appointed, or other third party (not shown), between cash 602 for the conversion option 506 to the Parent 100 and cash 604 for the FinCo bond 512 to FinCo 502, creating an OID for the FinCo bond 512, as outlined in the indenture. FinCo 502 is obligated to pay any bond coupon as well as full principle at maturity.

FinCo 502 passes the cash 604 received for the FinCo bond 512 in cash 606 through to OpCo 500 to pay for the OpCo bond 510.

During the term of the Convertible 508, OpCo 500 will make all interest payments on its bond to FinCo 502 and FinCo 502 will make the corresponding interest payments to Investors 202. FinCo 502 will accrete the amount it owes to Investors 202 on the FinCo bond 512 up to an amount equal to the par value of the Convertible 508.

The same tax and accounting benefits may be realized with multiple subsidiaries as with just one subsidiary. The Parent 100 will be able to deduct tax interest expense equal to the coupon plus the accretion of the OID, the total of which may approximate the Parent's straight borrowing rate. For accounting, the Parent 100 will show an interest expense coupon that is equal to the coupon of the Convertible 508. By separating payment for the Convertible 508 into the cash 602 for the conversion option 506 payable to the Parent and the cash 604 for the FinCo bond 512 payable to FinCo 502, the transfer agent has enabled the Parent to generate tax deductions above the stated coupon of the Convertible 508 while not increasing the accounting interest expense charge.

Figure 7:
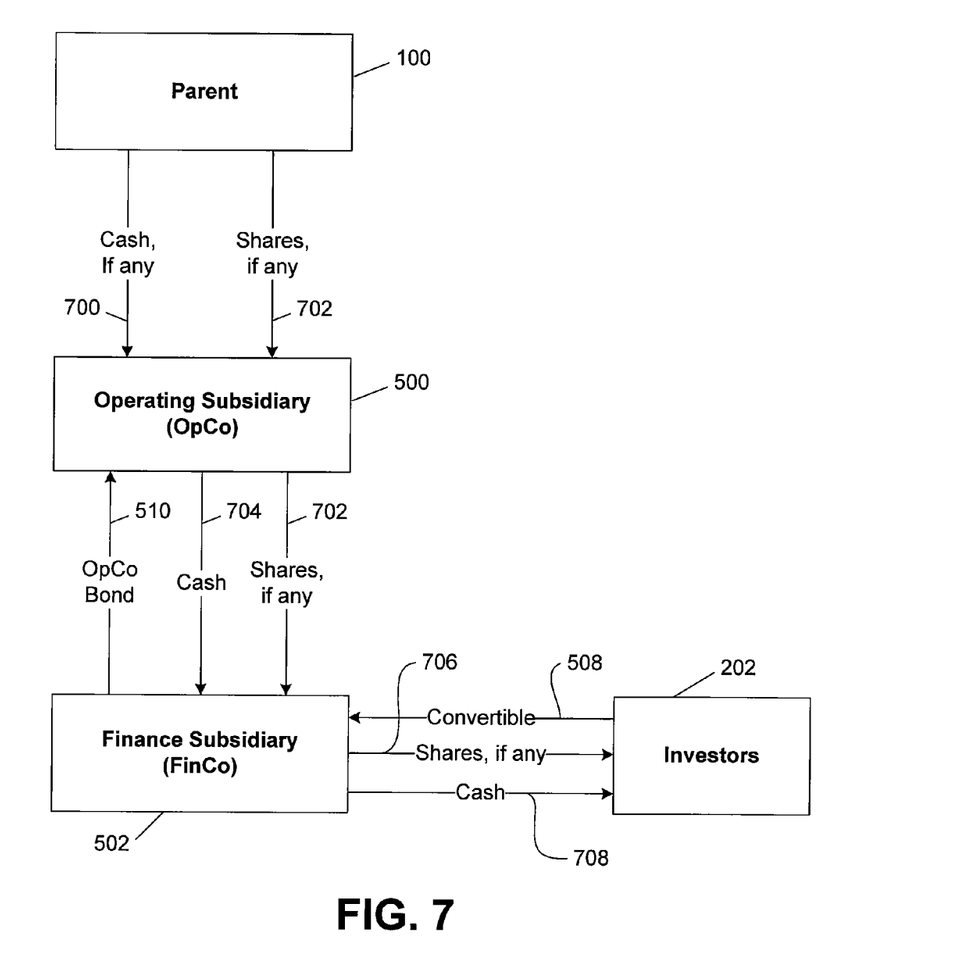
FIGS. 7 and 8 are schematic diagrams of the parties and transactions associated with the conversion or maturity of the convertible instrument of FIG. 5.

As shown in FIG. 7, upon conversion of the Convertible 508 and similarly to when there is a single Subsidiary 102, the Parent 100 will deliver to FinCo 502 through OpCo 500 (i) cash 700 equal to the difference, if any, between the par value of the Convertible 508 and the accreted face amount of FinCo's bond 512 and (ii) shares equal to the difference in value, if any, between the parity value of the Convertible 508 (which equals the share price at maturity multiplied by the conversion rate) and the par value of the Convertible 508. FinCo 502 will deliver to OpCo 500 the OpCo bond 510, and in return OpCo 500 will deliver to FinCo 502 cash 704 to pay the principle of the OpCo bond 510. Cash 704 from OpCo 500 to FinCo 502 will also include cash 700, if any, from the Parent 100 to OpCo 500. FinCo 502 will, in its role as the Parent's agent, deliver to Investors 202 the shares 706, if any, and cash 708 equal to the par value of the Convertible 508. FinCo 502 may elect to have its transfer agent duties for the Parent's stock and any cash remaining under the Parent's amortizing debt obligation performed by a sub-agent. The Convertible indenture will state that it is the Parent's contractual obligation to deliver shares 702 and, if required, cash 700 upon conversion of the Convertible 508. The Investors 202 receive the conversion value of the Convertible 508, but the distribution of the cash the Parent 100 and FinCo 502 each pay may differ depending on the accreted value and par value Convertible. The amount of shares paid by the Parent 100 is unaffected by any cash distribution difference.

Figure 8:
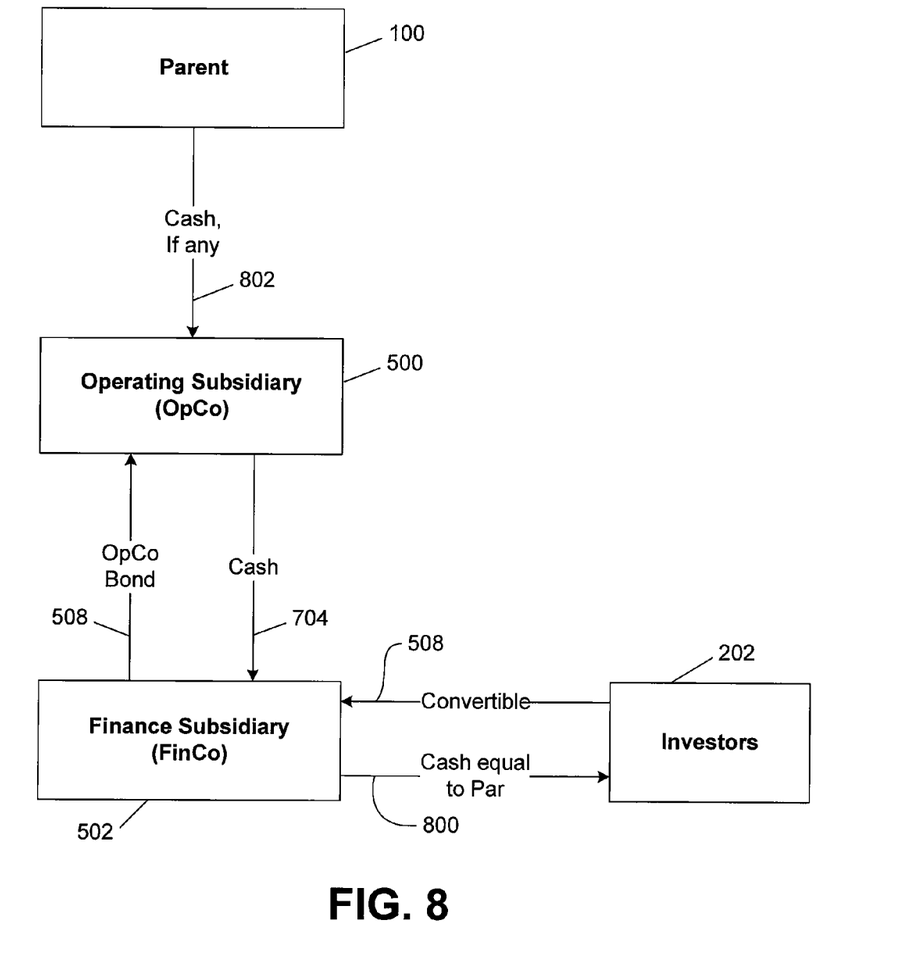

Upon a put of the Convertible 508, FinCo 502 will deliver in cash the accreted face amount of the FinCo bond 512 directly to Investors 202. Alternatively, as shown in FIG. 4, at maturity FinCo 502 will deliver in cash 800 the par of the FinCo bond 512 directly to Investors 202. The Parent 100 will deliver to Investors 202, through FinCo 502, an amount in cash 802, if any, equal to the difference between the par value of the Subsidiary bond 110 and the accreted face amount of the Subsidiary bond 110.

Each convertible bond instrument contains a debt obligation that is to be repaid, at least in part with shares of the issuer's stock, and a cash settlement feature which enables the issuer to settle at least a portion of its debt obligation in cash, as opposed to the shares. In some cases, paper bonds might be issued. In any case, data processing systems or a data processing system will be used to record and manage transaction information connected with the bond sales. In many cases, the data processing system and database will be managed by a transfer agent. Also, in many cases, paper bonds are not actually issued to a holder, but rather, a record of the holder's rights is simply recorded as a data structure containing a book entry in data processing system. Bonds issued in this fashion are referred to as being held in "book entry form."

The transfer agent, which services the transaction, will typically track the underlying reference securities and service the security as well. The transfer agent will typically use a computerized accounting system capable of tracking the network. This system will also make calculations that are required when the debt obligation of a convertible instrument is settled. The system may also be used for data reporting services which are important for tax and financial calculations by the issuer. To perform this operation a connection between the data transfer agent's processing system and database is used.

Financial information needed to perform the required calculations is retained in a data processing system, and may include factors such as the option pricing model used, the par and current accreted value of the bonds, the current share price of the stock, the anticipate stock volatility, the credit spread of the issuer, the expected hedge of the buyer, and other assumptions. In most cases, these numbers are updated at regular intervals. Information about the bonds themselves, the distribution of cash for the bonds to the subsidiary and for the cash for the conversion to the parent, and the stock is collected, usually from the transfer agent, sometimes using a network or data path connection.

It should be noted that many of the functions described herein can be carried out at least in part with the assistance of data processing resources, including computing platforms or instruction execution systems. Such systems include a central processing unit (CPU), random access memory (RAM), storage media, and computer program code in the form of computer software. Various functions can be performed either on stand-alone systems or on systems interconnected with the network.

In various embodiments of the present invention, the convertible instruments may be issued either pursuant to SEC Rule 144A with subsequent resale registration rights or pursuant to a registration statement. The indenture and all contractual documentation for the convertible instruments may be drafted to prohibit any separation of the components of the convertible instruments. In addition, the ultimate registration of the convertible instruments may not apply to their components. That is, if the convertible instruments are registered, their separable components may not be required to be registered.

Specific embodiments of an invention are described herein. One of ordinary skill in the financial management arts will recognize that the invention can be applied in other environments and in other ways. It should also be understood that an implementation of the invention can include features and elements or steps in addition to those described and claimed herein. Thus, the following claims are not intended to limit the scope of the invention to the specific embodiments described herein.

What is claimed is:

1. A method comprising:
   recording a warrant in a computer readable storage medium, wherein the warrant is created by a parent company;
   recording a transfer in a computer readable storage medium, wherein the transfer involves the parent company transferring the warrant to a subsidiary company of the parent company;

recording a nonconvertible debt instrument in a computer readable storage medium, wherein the nonconvertible debt instrument is created by the subsidiary company;

creating, using a computer, an exchangeable security by attaching the warrant to the nonconvertible debt instrument such that the warrant enables a holder of the exchangeable security to exchange the nonconvertible debt instrument for an equity position in the parent company; and recording an issuance in a computer readable storage medium, wherein the issuance involves the subsidiary company issuing the exchangeable security to an investor.

2. The method of claim 1, wherein the subsidiary company comprises a wholly owned, fully consolidated subsidiary of the parent company.

3. The method of claim 1, wherein the warrant comprises a conversion option.

4. The method of claim 1, wherein the nonconvertible debt instrument comprises a bond.

5. The method of claim 1, wherein the equity position in the parent company comprises shares of stock.

6. The method of claim 1, further comprising:
documenting, in an indenture, inseparability of the warrant and the nonconvertible debt instrument.

7. A method comprising:
recording a warrant in a computer readable storage medium, wherein the warrant is created by a parent company;

recording a first transfer in a computer readable storage medium, wherein the first transfer involves the parent company transferring the warrant to a first subsidiary company, the first subsidiary company being a subsidiary of the parent company;

recording a first nonconvertible debt instrument in a computer readable storage medium, wherein the first nonconvertible debt instrument is created by the first subsidiary company;

recording a second transfer in a computer readable storage medium, wherein the second transfer involves the first subsidiary company transferring, the warrant and the first nonconvertible debt instrument to a second subsidiary company, the second subsidiary company being a subsidiary company of the first subsidiary company;

recording a second nonconvertible debt instrument in a computer readable medium, wherein the second nonconvertible debt instrument is created by the second subsidiary company;

creating, using a computer, an exchangeable security by attaching the warrant to the second nonconvertible debt instrument such that the warrant enables a holder of the exchangeable security to exchange the second nonconvertible debt instrument for an equity position in the parent company; and recording an issuance in a computer readable storage medium, wherein the issuance involves the second subsidiary company issuing the exchangeable security to an investor.

8. The method of claim 7, wherein each subsidiary company comprises a wholly owned, fully consolidated subsidiary of the preceding company.

9. The method of claim 7, wherein the warrant comprises a conversion option.

10. The method of claim 7, wherein each subsidiary nonconvertible debt instrument comprises a bond.

11. The method of claim 7, wherein the equity position in the parent company comprises shares of stock.

12. The method of claim 7, further comprising:
documenting, in an indenture, inseparability of the warrant and the second nonconvertible debt instrument.

13. The method of claim 7, wherein each of the subsidiary companies, through which the first subsidiary company transfers the first nonconvertible debt instrument to the second subsidiary company, issues a nonconvertible debt instrument to a subsidiary company of its own that is comparable to the first nonconvertible debt instrument.

14. A method wherein a parent company creates a warrant and electronically transfers the warrant to a subsidiary company, and wherein the subsidiary company creates a nonconvertible debt instrument, the method comprising:

creating, using a computer, an exchangeable security by attaching the warrant to the nonconvertible debt instrument such that the warrant enables a holder of the exchangeable security to exchange the nonconvertible debt instrument for an equity position in the parent company; and recording, in computer readable storage media, payment remitted from a holder of the exchangeable security to the parent company for the value of the warrant and to the subsidiary company for the value of the nonconvertible debt instrument.

15. The method of claim 14, wherein the warrant comprises a conversion option.

16. A computer system comprising:
a warrant database, wherein a warrant created by a parent company is recorded;

a warrant transfer database, wherein an electronic transfer of the warrant from the parent company to a recipient subsidiary company of the parent company is recorded;

a nonconvertible debt instrument database, wherein a nonconvertible debt instrument created by the recipient subsidiary company is recorded; and a processor operatively connected to the warrant database, the warrant transfer database, and the nonconvertible debt instrument database and configured to:
create an exchangeable security by attaching the warrant to the nonconvertible debt instrument such that the warrant enables a holder of the exchangeable security to exchange the nonconvertible debt instrument for an equity position in the parent company.

17. An apparatus comprising:
a computer readable storage medium; and
a processor operatively connected to the computer readable storage medium and configured to:
record a warrant in the computer readable storage medium, wherein the warrant is created by a parent company;

record a transfer of the warrant in the computer readable storage medium, wherein the parent company electronically transfers the warrant to a recipient subsidiary company of the parent company;

record a nonconvertible debt instrument in the computer readable storage medium, wherein the nonconvertible debt instrument is created by the recipient subsidiary company;

create an exchangeable security by attaching the warrant to the nonconvertible debt instrumentsuch that the warrant enables a holder of the exchangeable security to exchange the nonconvertible debt instrument for an equity position in the parent company; and record an issuance in the computer readable storage medium, wherein the issuance involves the subsidiary company issuing the exchangeable security to an investor.

18. A method comprising:
recording receipt of a warrant in a computer readable storage medium, wherein the warrant is created by a parent company, wherein the warrant is electronically transferred from the parent company to a recipient subsidiary company;
recording a nonconvertible debt instrument in a computer readable storage medium, wherein the nonconvertible debt instrument is created by the recipient subsidiary company;
creating, using a computer, an exchangeable security by attaching the warrant to the nonconvertible debt instrument such that the warrant enables a holder of the exchangeable security to exchange the nonconvertible debt instrument for an equity position in the parent company; and
recording an issuance in a computer readable storage medium, wherein the issuance involves the subsidiary company issuing the exchangeable security to an investor.

19. A method comprising:
receiving information about a warrant, the warrant being issued by a parent company to a subsidiary company of the parent company;
recording information about the warrant in storage media of a computerized apparatus configured to maintain a record of one or more exchangeable securities;
receiving information about a nonconvertible debt instrument, the nonconvertible debt instrument being created by the subsidiary company;
recording information about the nonconvertible debt instrument in the storage media of the computerized apparatus;
creating, using a computer, an exchangeable security by attaching the warrant to the nonconvertible debt instrument such that the warrant enables a holder of the exchangeable security to exchange the nonconvertible debt instrument for an equity position in the parent company;
receiving information about an issuance, wherein the issuance involves the subsidiary company issuing the exchangeable security to an investor; and
recording information about the issuance in the storage media of the computerized apparatus.

20. The method of claim 19, further comprising:
receiving information about an investor exchanging value for the nonconvertible debt instrument and the attached warrant;
recording information about the investor in the storage media of the computerized apparatus; and
recording an association between the investor, the warrant, and the nonconvertible debt instrument in the storage media of the computerized apparatus.

21. The method of claim 19, wherein the method is performed by the subsidiary company, wherein the receiving the information about the warrant comprises receiving the warrant from the parent company, and wherein the receiving the information about the nonconvertible debt instrument comprises creating the nonconvertible debt instrument.

22. The method of claim 19, further comprising:
selling the exchangeable security to the investor; and
recording the sale of the exchangeable security in the storage media of the computerized apparatus.

23. The method of claim 22, wherein the selling the exchangeable security comprises the subsidiary company receiving value from the investor for the nonconvertible debt instrument and the parent company receiving value from the investor for the warrant.

24. The method of claim 19, wherein the warrant comprises a conversion option.

25. The method of claim 19, wherein the equity position in the parent company comprises shares of stock in the parent company, wherein the warrant allows an investor to acquire shares of stock in the parent company when the value of the shares of stock exceeds a predetermined amount, and wherein recording information about the warrant comprises recording information about the predetermined amount.

26. The method of claim 19, wherein the nonconvertible debt instrument comprises an exchangeable bond issued by the subsidiary company.

27. The method of claim 19, wherein the receiving the information about the warrant comprises receiving information about the warrant being transferred from the parent company to the subsidiary company through one or more other subsidiary companies.

28. The method of claim 19, further comprising:
creating an indenture documenting inseparability of the warrant and the nonconvertible debt instrument.

29. The method of claim 19, wherein the subsidiary company comprises a wholly owned, fully consolidated subsidiary of the parent company.

30. The method of claim 19, wherein the recording the information about the nonconvertible debt instrument comprises recording a coupon rate.

31. The method of claim 19, further comprising:
receiving information about the nonconvertible debt instrument and the attached warrant being issued by an issuer to an investor; and
recording an obligation that the issuer settle the par value of the nonconvertible debt instrument and the attached warrant in cash and settle the remainder in shares of the parent company's stock.

32. An apparatus comprising:
a computer readable storage medium comprising computer readable program code stored therein; and
a processor operatively coupled to the computer readable storage media and configured to execute the computer readable program code to:
record information about a warrant in the computer readable storage medium, wherein the warrant is created by a parent company and transferred from the parent company to a subsidiary company;
record information about a nonconvertible debt instrument in the computer readable medium, wherein the nonconvertible debt instrument is created by the subsidiary company;
create an exchangeable security by attaching the warrant to the nonconvertible debt instrument such that the warrant enables a holder of the exchangeable security to exchange the nonconvertible debt instrument for an equity position in the parent company; and
record in the computer readable medium that the exchangeable security is issued by the subsidiary company to an investor.

33. The apparatus of claim 32, wherein the processor is configured to associate the warrant with the nonconvertible debt instrument in the computer readable medium by recording an attachment of the warrant to the nonconvertible debt instrument in the computer readable storage medium.

34. The apparatus of claim 32, wherein the processor is further configured to execute the computer readable program code to:

record information about the subsidiary company issuing the exchangeable security to the investor.

35. The apparatus of claim 32, wherein the processor is further configured to execute the computer readable program code to:
   allocate a portion of a payment received from the investor for the exchangeable security between the parent company and the subsidiary company such that a subsidiary bond obligation is created with an original issue discount, wherein the original issue discount comprises the difference between the payment received from the investor for the exchangeable security and the initial value of the subsidiary's nonconvertible debt instrument.

36. The apparatus of claim 35, wherein the processor is further configured to execute the computer readable program code to:
   determine for the parent company's tax purposes a tax interest expense deduction comprising a sum including any accretion of the original issue discount and any coupon associated with the subsidiary's nonconvertible debt instrument.

37. The apparatus of claim 35, wherein the processor is further configured to execute the computer readable program code to:
   determine, upon exchange of the exchangeable security by the investor, that the subsidiary company owes the investor an accreted face value of the nonconvertible debt instrument based on a coupon rate for the nonconvertible debt instrument and a length of time since the exchangeable security was issued to the investor; and
   determine, upon exchange of the exchangeable security by the investor, that the parent company owes the investor cash in an amount comprising the difference, if any, between the par value of the exchangeable security and the accreted face value of the nonconvertible debt instrument, and shares the value of which comprises the difference, if any, between the parity value of the exchangeable security and the par value of the exchangeable security.

* * * * *